US007396373B2

(12) United States Patent
Lagerstedt et al.

(10) Patent No.: US 7,396,373 B2
(45) Date of Patent: Jul. 8, 2008

(54) CENTRIFUGAL SEPARATOR FOR CLEANING GASES

(75) Inventors: Torgny Lagerstedt, Stockholm (SE); Claes Inge, Saltsjö-Duvnäs (SE); Peter Franzèn, Huddinge (SE); Olev Maehans, Tullinge (SE); Martin Sandgren, Nacka (SE)

(73) Assignee: 3nine AB, Nacka Strand (SE)

( * ) Notice: Subject to any disclaimer, the term of this patent is extended or adjusted under 35 U.S.C. 154(b) by 134 days.

(21) Appl. No.: 10/573,306

(22) PCT Filed: Oct. 6, 2004

(86) PCT No.: PCT/SE2004/001429

§ 371 (c)(1),
(2), (4) Date: Sep. 26, 2006

(87) PCT Pub. No.: WO2005/032723

PCT Pub. Date: Apr. 14, 2005

(65) Prior Publication Data

US 2007/0163215 A1 Jul. 19, 2007

(30) Foreign Application Priority Data

Oct. 7, 2003 (SE) .................................... 0302648

(51) Int. Cl.
*B01D 45/00* (2006.01)

(52) U.S. Cl. ............................ 55/406; 55/337; 55/401; 55/407; 95/270

(58) Field of Classification Search ................... 55/337, 55/401, 406, 407; 95/270
See application file for complete search history.

(56) References Cited

U.S. PATENT DOCUMENTS 3,234,716 A * 2/1966 Sevin et al. .............. 210/360.1

(Continued)

FOREIGN PATENT DOCUMENTS

EP 0340087 11/1989
EP 0553022 7/1993

(Continued)

*Primary Examiner*—Duane Smith
*Assistant Examiner*—Sonji Turner
(74) *Attorney, Agent, or Firm*—Robert D. Katz; Cooper & Dunham LLP

(57) ABSTRACT

A centrifugal separator device (10) for separating solid and/or liquid particles which are suspended in gas media, which device comprises a rotor (12) which is provided sedimentation members (14), which is rotatably mounted in a surrounding stationary housing (20) and which has a central inlet for the gas medium which is to be cleaned. The housing (20) has, on the one hand, an outlet (32) for cleaned gas which, during its passage through the sedimentation members (14) in the rotor (12), has been freed form solid and/or liquid particles, and, on the other hand, an outlet (28 *a-c*) for solid and/or liquid particles which have been transferred onto the inner side of the housing. A number of parallel guide rails (26), which run helically, are arranged on the inner side of the housing and extends axially at least over a major part of the length of the rotor (12), and the outlet (32) in the housing for cleaning gas is located, with respect to the axis, at one end of the rotor (12) while the outlet (28*a-c*9 for the particles which have been collected on the housing wall is located at the opposite axial end of the rotor. The guide rails (26) are arranged in a direction on the inner side of the housing in relation to the direction of rotation of the rotor which is such that a peripherally outer of a gas vortex generated by the rotor is forced to entrain the particles which have been collected between the guide rails toward the particles outlet.

10 Claims, 1 Drawing Sheet

U.S. PATENT DOCUMENTS 4,361,490 A * 11/1982 Saget ........................ 210/787
4,460,393 A * 7/1984 Saget .......................... 55/406
4,478,718 A * 10/1984 Saget ..................... 210/512.3

FOREIGN PATENT DOCUMENTS

WO 0136103 5/2001

* cited by examiner

A-A

CENTRIFUGAL SEPARATOR FOR CLEANING GASES

TECHNICAL FIELD

The present invention relates to a device for separating solid and/or liquid particles which are suspended in gas media, which device comprises a rotor which is provided with sedimentation members, which is rotatably mounted in a surrounding, stationary housing and which has a central inlet for the gas medium which is to be cleaned, with the housing having, on the one hand, an outlet for cleaned gas which, during its passage through the sedimentation members in the rotor has been freed from solid and/or liquid particles, and, on the other hand, an outlet for the solid and/or liquid particles, which are firstly deposited on the sedimentation members and, after that transferred, by means of a centrifugal force, onto a side wall of the housing, with the outlet for the solid and/or liquid particles having the form of at least one aperture which is included in the side wall of the housing.

BACKGROUND TO THE INVENTION

SE-A-0202671-4 describes a centrifugal separator of the type mentioned at the outset, which centrifugal separator functions satisfactorily for cleaning gas media containing a relatively low or moderate degree, of liquid or particle impurities and while the flows of gas and liquid/particles downstream of the rotor go in the same axial direction toward their respective outlet apertures. When the contaminated gas is being cleaned, it flows into a central inlet shaft in the rotor which comprises a large number of inset plates which are stacked closely one upon the other, such as conical disks, or a multiplicity of curved axial plates, or some other form of sedimentation members having an equivalent function, after which the particles in the gas are caused to sediment on the sedimentation members in connection with the gas escaping radially from the rotor. The sediment particles then slide outward along the sedimentation members and are finally flung, by centrifugal forces, over onto the surrounding, stationary housing wall. With the aid of the component of the axial and tangential flow of the gas in the housing, the particles which have been collected on the housing wall stream, in this connection, in helical "rivulets" along the wall in the direction toward an annular screening element which projects inward essentially radially from the side wall of the housing and which separates the gas outlet from an outlet for the solid and/or liquid particles. The inwardly directed screening element creates, on its upstream side, an air cushion-forming vortex which forms a barrier for the rivulets and/or drops of liquid or solid particles which are streaming toward the outlet such that the latter are formed into a stationary ring upstream of the screening element. By means of placing one or more outlet holes or slits at the site of this ring-shaped accumulation of liquid or particles, it is possible, in an undisturbed manner, to draw off the liquid/particles from the housing of the centrifugal separator without there being any remixing with the cleaned gas.

However, when such a separator is used for separating a large content of liquid and/or particles from gases, problems can arise due to the fact that the liquid flow can penetrate through the air cushion vortex and reach the screening element either directly or as splashes from slits or apertures at the liquid outlet, with it being possible for some of the liquid to be entrained out toward the outlet for the cleaned gas stream and to be reincorporated into the latter.

OBJECTS OF THE INVENTION AND THEIR ACHIEVEMENT

An object of the present invention is to produce a separating device which has the ability to efficiently clean gas flows which contain relatively large quantities of liquid and/or solid particles (>approx. 10 g/$m^3$).

To this end, the device according to the invention which was mentioned at the outset is characterized in that a number of parallel guide rails, which run helically, are arranged on the inner side of the housing and extend axially at least over a major part of the length of the rotor and in that the outlet, in the housing, for cleaned gas is located, with respect to the axis, at one end of the rotor while the outlet for the particles which have been collected on the housing wall is located at the opposite axial end of the rotor, with the guide rails being arranged in a direction on the inner side of the housing in relation to the direction of rotation of the rotor which is such that a peripherally outer part of a gas vortex generated by the rotor is forced to entrain the particles which have been collected between the guide rails toward the particle outlet. In this way, the layer of the gas stream which is located closest to the housing wall can be caused, with the aid of the guide rails, to travel in the axial direction which is opposite to that of the main flow of the gas and, in this connection, entrain the liquid, which has been collected on the housing wall, in an opposite direction to that of the main stream of cleaned gas, to a liquid outlet where the liquid can be fed out in a quiet region where there is no risk of disturbances from a powerful gas flow. The guide rails also dampen the rotation of the gas closest to the housing wall, with this in turn decreasing the risk of liquid which has been separated out evaporating or being reincorporated.

Additional features of the device according to the invention are specified in the independent patent claims and will be evident from the detailed description which follows and which refers to the attached drawing.

DETAILED DESCRIPTION OF A PREFERRED EMBODIMENT

Figure 1:
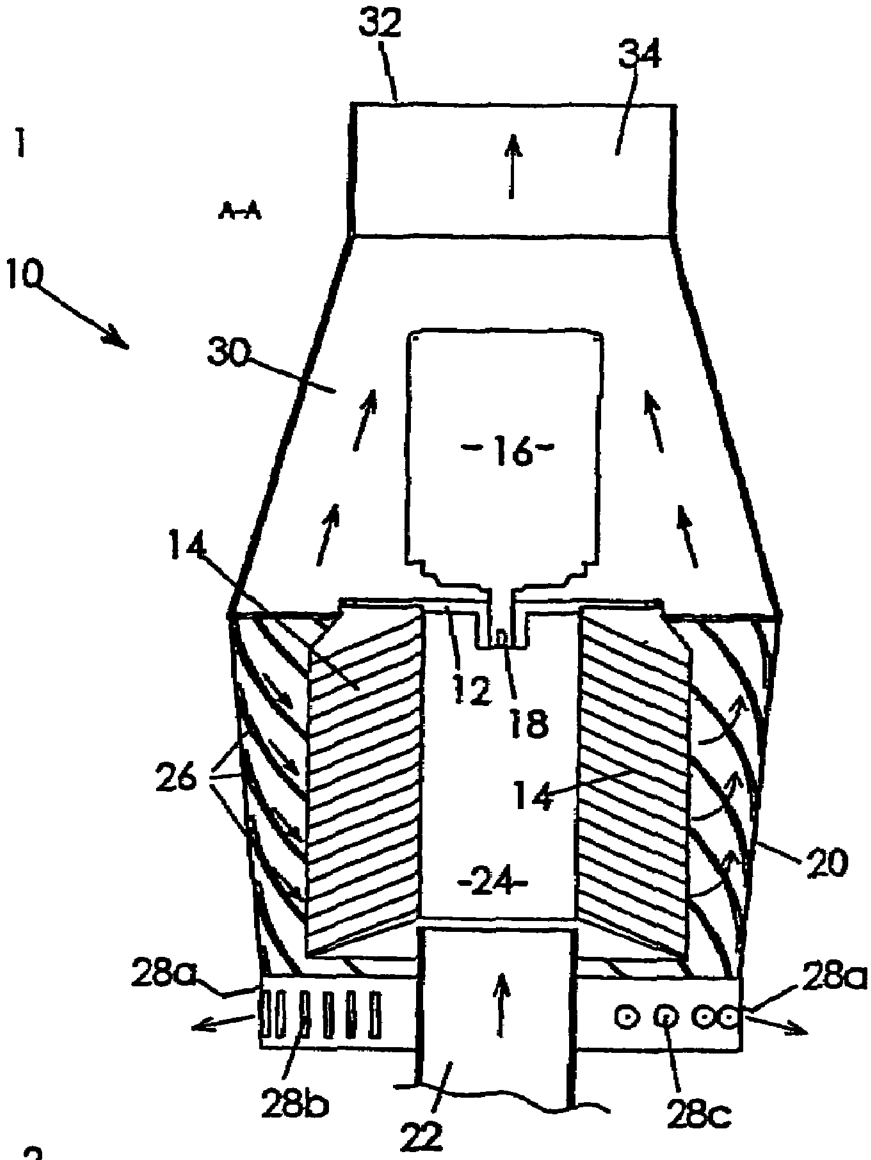
FIG. 1 is a longitudinal section view of a separation device in accordance with the present invention.

In FIG. 1, 10 denotes, in a general manner, a centrifugal separator according to the invention for separating solid and/or liquid particles which are suspended in gas media, for example for cleaning air which contains an oil mist or other very fine particles. In order to meet increasing environmental demands within industrial premises, it is frequently necessary to conduct out polluted air, or other gases, by way of long conduit systems, to large external cleaning devices.

The centrifugal separator 10 according to the invention is so compact that it can be placed directly on the machine which is generating a contaminated gas medium and makes it possible to clean such contaminated air so efficiently that the latter can be released into the premises in direct association with the process machine or machines in question.

The centrifugal separator 10 comprises a rotor 12 which has a number of sedimentation members in the form of inset plates 14 which are mounted on it and which preferably has an axis of rotation which is oriented vertically. The inset plates 14, on which solid and/or liquid particles which are suspended in the gas are to be deposited by means of sedimentation, can have the form shown diagrammatically in FIG. 1, namely that of conical disk elements which are stacked one upon the other and which are separated axially by a small distance. The rotor 12 is driven by a motor 16 via an axle 18. A stationary housing 20, which has a conical shape, surrounds the rotor 12 and has an intake 22 for the gas which is to be cleaned. The intake 22 is located directly in front of a central inlet shaft 24 in the rotor 12.

The inner side of the stationary housing 20 exhibits a number of guide rails 26 which are distributed in the circumferential direction, which run helically and in a parallel manner, and which, in the example shown, extend axially from an upper, gas outlet end of the housing 20 toward a lower end of the housing where a separated flow of liquid and/or particles can be led out of the housing via an outlet in the form of a circumferential slit 28*a* or a number of peripheral holes 28*c*. Alternatively, the outlet can consist of axial slits 28*b* between the guide rails 26. The guide rails 26 should extend downward at least over the major part of the axial length of the rotor 12 while beginning at least from the level opposite the downstream end of the rotor 12. Consequently, the guide rails 26 do not always need to extend along the whole of the length of the rotor 12; instead, it can be sufficient, in certain applications, for them to cover a length which corresponds to at least the upper half of the rotor 12.

Depending on the type and quantity of the contamination level and other operational parameters, the inclination of the guide rails 26 in relation to the central axis of the housing 20 and of the rotor 12 can vary. For example, the guide rails 26 can have an inclination to the central axis of between approx. 30 and 80°, preferably approx. 45°. The number of rails can also vary in accordance with different operational parameters. Thus, the number can lie within the approximate range 5-40.

Downstream of the rotor 12, the housing 20 has an outlet channel 30 for cleaned gas which leads to a gas outlet 32. When there is a requirement for only extremely clean gas being allowed to leave the separator 10, an additional Hepa filter 34, or its equivalent, can be coupled into the gas outlet channel 30 downstream of the rotor 12.

Figure 2:
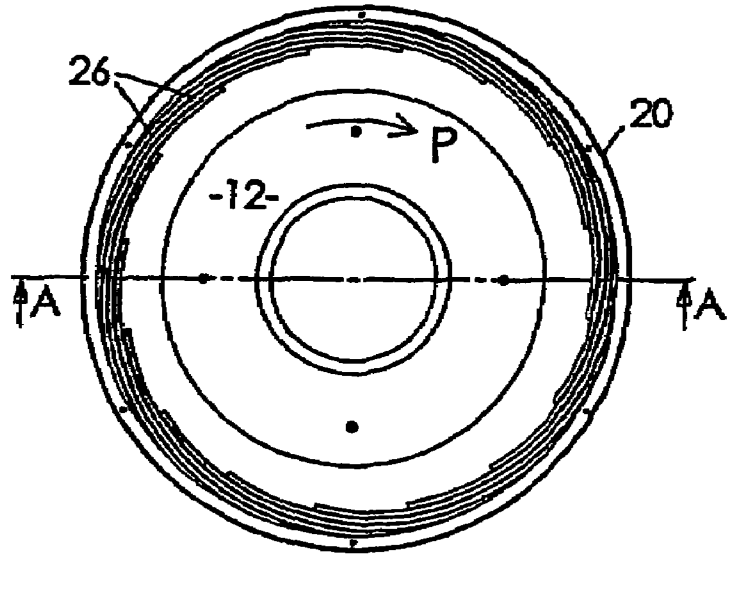
FIG. 2 is a plan view of a lower part of the device in FIG. 1.

During operation, gas which is to be cleaned flows into the central inlet shaft 24 in the rotor 12, after which the particles in the gas are caused to sediment on the inset plates 14 in connection with the gas flowing out radially from the rapidly rotating rotor 12. The sediment particles slide outward along the plates 14 and are finally flung, by the centrifugal force, over onto the inner side of the surrounding, stationary housing 20. Due to the fact that the rotor 12 is rotating in a clockwise direction (see the arrow P in FIG. 2), a peripherally outer part of a gas vortex which is generated by the rotor 12 will, even though the main flow of the gas which is streaming out of the rotor and which has been freed from particles and liquid drops streams upward in the housing 20 toward the gas outlet 32, be forced, by the guide rails 26, to entrain the particles which have been collected between the guide rails 26 toward the lower particle outlet, i.e. in a direction which is opposite to that of the main flow of the gas. In this way, the solid and/or liquid particles are given a controlled helical direction of flow downward along the inner side of the housing 20 in the form of rivulets of liquid and/or the solid particles. In this way, the liquid can be fed out of the housing 20 in a relatively quiet lower region in the housing 20 where there is little risk of disturbances from a powerful gas flow. The guide rails 26 also dampen the rotation of the gas closest to the housing wall, thereby reducing the risk of liquid which has been separated out evaporating or being reincorporated into the cleaned gas flow.

The invention claimed is:

1. A centrifugal separator device for separating solid and/or liquid particles which are suspended in gas media, comprising a rotor which is provided with sedimentation members, which is rotatably mounted in a surrounding, stationary housing and which has a central inlet for the gas medium which is to be cleaned, with the housing having, on the one hand, an outlet for cleaned gas which, during its passage through the sedimentation members in the rotor, has been freed from solid and/or liquid particles, and, on the other hand, an outlet for the solid and/or liquid particles, which are firstly deposited on the sedimentation members and, after that, transferred, by means of a centrifugal force, onto a side wall of the housing, with the outlet for the solid and/or liquid particles having the form of at least one aperture which is included in the side wall of the housing, wherein a number of parallel guide rails which run helically are arranged on the inner side of the housing and extend axially at least over a major part of the length of the rotor and in that the outlet, in the housing, for cleaned gas is located, with respect to the axis, at one end of the rotor while the outlet for the particles which have been collected on the housing wall is located at the opposite axial end of the rotor, with the guide rails being arranged in a direction on the inner side of the housing in relation to the direction of rotation of the rotor which is such that a peripherally outer part of a gas vortex generated by the rotor is forced to entrain the particles which have been collected between the guide rails toward the particle outlet.

2. The device as claimed in claim 1, wherein the guide rails extend axially beginning at least level with the downstream end of the rotor and finishing axially at least over half the length of the rotor in the direction toward the particle outlet.

3. The device as claimed in claim 1, wherein the housing and the rotor are oriented along a vertical axis with the particle outlet being located in a lower section of the housing while the gas outlet is located in an upper section of the housing.

4. The device as claimed in claim 1, wherein the guide rails incline at approximately 30-80° in relation to the longitudinal central axis of the device.

5. The device as claimed in claim 4, wherein the inclination is approximately 45°.

6. The device as claimed in claim 4, wherein the number of guide rails which run in parallel from 5 to 40.

7. The device as claimed in claim 1, wherein the housing tapers toward the particle outlet.

8. The device as claimed in claim 4, wherein the particle outlet has the form of a circular slit in a lower part of the housing.

9. The device as claimed in claim 4, wherein the particle outlet has the form of one or more axial slits between the guide rails.

10. The device as claimed in claim 4, wherein the particle outlet has the form of a number of apertures which are distributed in the circumferential direction in the lower part of the housing.

* * * * *